March 20, 1962

C. R. ROCHE 3,025,725

TRANSMISSION CONSTRUCTION

Filed Aug. 9, 1949

INVENTOR.
Clifton R. Roche.
BY
Harness Dickey & Pierce.
ATTORNEYS.

United States Patent Office 3,025,725
Patented Mar. 20, 1962

3,025,725
TRANSMISSION CONSTRUCTION
Clifton R. Roche, 101 S. Sycamore St.,
Los Angeles, Calif.
Filed Aug. 9, 1949, Ser. No. 109,301
28 Claims. (Cl. 74—754)

The present invention relates to control systems for automatic transmissions. The invention is particularly adaptable to motor vehicle transmissions incorporating hydraulically operable elements, and includes improved fluid supply and pressure control means adapted to correlate the action of a plurality of sources of fluid pressure with respect to a plurality of fluid operable components actuatable thereby.

An important object of the invention is to provide such an improved hydraulic sysem for controlling the operation of a motor vehicle transmission having a front pump drivable by the engine of the vehicle, a rear pump drivable by the transmission output shaft, and a selector valve for selectively preconditioning the transmission to drive either forwardly or reversely, or for releasing the driving components to establish a neutral, which parts are so arranged that at certain times the fluid supply is derived from the front pump and at other times from the rear pump, yet neither pump can interfere with the action of the other or permit the escape of fluid emanating from the other pump, and the rear pump cannot draw fluid from the hydraulic system due to its reverse rotation when the transmission is operating in reverse.

Another object is to provide such a control system incorporating improved means for supplying the hydraulically operable components with fluid from the front pump during starting and high torque loading conditions and until the vehicle has reached a predetermined speed, and for automatically transferring the fluid supply from the front pump to the rear pump, and relieving the load upon the front pump, during higher speed driving and under conditions of lighter torque demand, thereby conserving the power of the engine.

A related object is to provide such a system which automatically varies the output pressure of at least one of the pumps in accordance with the torque demand, and which also changes the fluid supply connection back and forth from one pump to another in accordance with such factors of speed and torque load and relative torque demand.

Still another object is to provide novel and improved means for controlling the pressure in a hydrokinetic torque converter.

A further object is to provide improved means for varying the pressure of hydraulic actuating fluid delivered to the several hydraulically operable components of such a transmission in accordance with the torque load upon such components.

Another object is to provide improved means for controlling the rate of engagement of torque transmitting elements of the friction type, such as brakes and clutches, to eliminate the frequently-encountered tendency of such elements to pick up a load with such rapadity as to cause objectionable noise, or lurching of the vehicle.

Another object is to provide an improved fluid supply and control system of the character indicated which incorporates a plurality of pumps constituting separate sources of fluid pressure, with improved means for disabling one of the pumps to relieve the driving load it represents while permitting continued operation upon a reduced number of operative pumps under certain running conditions, and novel means for quickly and automatically making available the output of the disabled pump whenever, and for so long as, the output of the operative pump or pumps becomes inadequate.

Other objects and advantages of the invention will become apparent upon consideration of the present disclosure in its entirety.

In the drawings:
FIG. 3 is a diagrammatic view similar to FIG. 2 but showing a modified arrangement.

Figure 1:
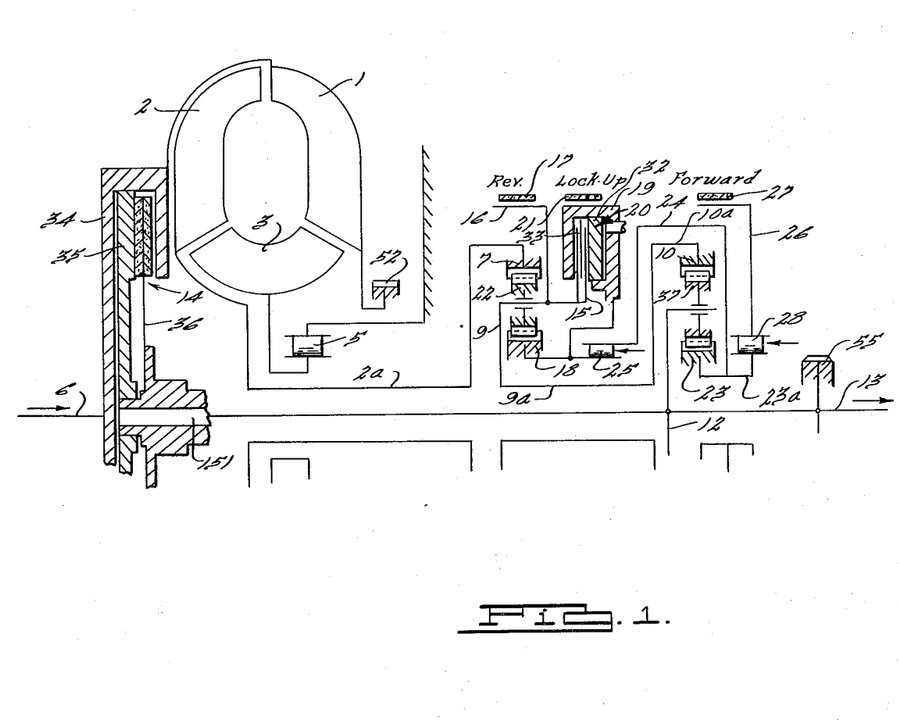
FIGURE 1 is a schematic longitudinal sectional elevational view of a transmission adapted to be controlled by my improved control system.

Referring now to the drawings, FIG. 1 shows, for purposes of illustration but not of limitation, the arrangement of the principal components of a transmission of a type adapted to be controlled by means incorporating the principles of the present invention. It will be recognized, however, that the transmission construction itself is subject to variation. Several suitable transmission constructions are shown in my Patent No. 2,645,137 granted July 14, 1953, and in my copending patent application Serial No. 93,355, filed May 14, 1949, and now Patent No. 2,785,581, the transmission construction shown in FIG. 1 hereof corresponding substantially to the transmission depicted in FIG. 3 of said patent, and in FIG. 8 of said prior application.

The transmission of FIG. 1 incorporates a direct drive friction clutch, generally designated 14, contained in a cylindrical casing 34 which also includes a piston 35 by which the clutch is actuatable. Hydraulic fluid for actuation of the clutch-operating piston is deliverable to the interior of the cylinder 34 through a suitable internal passage 151. The driving shaft 6 which may comprise the crankshaft of an internal combustion engine is directly coupled to the pump portion 1 of a hydraulic torque converter through the cylinder 34 which rotates as a unit with these parts. The hydraulic torque converter is indicated as of conventional design, and includes a turbine member 2 and a reaction member 3. The reaction member 3 is freely rotatable forwardly, but is held against reverse rotation in the opposite direction by an overrunning brake 5. Forward rotation is assumed to be clockwise as the assembly is viewed from the left, referring to FIG. 1. During torque multiplication in the converter, the reaction member 3 will remain stationary, but as the one-to-one ratio is approached, the reaction member will rotate in the direction of the pump and the turbine, and the torque converter here functions as a fluid clutch and flywheel assembly, as will be understood.

The turbine 2 is connected through a tubular shaft 2a to the internal toothed ring gear 7 of a front planetary gearset. This gearset also includes planet pinions 22 supported by a carrier 9, and a sun gear 18. The carrier 9 is connected through a tubular shaft 9a to the internal toothed ring gear 10 of a second or rear planetary gearset.

The rear planetary gearset also includes planet gears 37 and a sun gear 23. The planet gears of the rear set are directly connected to the output shaft 13 of the transmission, and it will be noted that such shaft also extends forwardly to direct connection with the driven disk 36 of the direct drive clutch 14.

Brake and clutch elements are provided for selectively holding and releasing or locking together elements of the two planetary gearsets to provide forward and reverse drives of different ratios.

The lowest speed drive is through the hydraulic torque converter and through both planetary gearsets in series.

At the lower speeds, and when the torque is relatively high, torque multiplication is also afforded through the hydrokinetic torque converter, and this multiplication is effective until the speed of the reaction member 3 approaches that of the engine.

A hydraulically operable friction disk clutch, generally designated 20, is provided for locking up the front planetary gearset. Such clutch assembly includes disk elements 15 keyed to the cage 9 and a coacting drum and disk assembly 19 keyed to the hub of the sun gear 18. The exterior of the drum 19 is cylindrical and is selectively engageable by a brake band 21. The clutch 20 is engageable by means of a piston 32 housed in the drum 19.

The sun gear 18 is also connected through an overrunning clutch 25 with the hub 23a of sun gear 23 of the rear planetary gearset. Overrunning clutch 25 acts in such direction as to permit the front sun gear 18 to rotate faster than the rear sun gear 23 in the direction of engine rotation, but prevents relative rotation of these gears in the reverse sense with respect to one another.

The hub 23a of the rear sun gear 23 also supports a drum 26 with respect to which it has a one-way driving connection through an overrunning clutch 28. A rear brake band 27 anchored to the transmission case is engageable with the drum 26 to hold it against rotating. The overrunning clutch 28 acts in such direction that when band 27 is applied the rear sun gear 23 is thereby held against reverse rotation, but remains free to rotate forwardly in the direction of engine rotation.

A brake drum 16 is also keyed to the front carrier 9 and adapted to be held against rotation, selectively, by a brake band 17.

A more detailed consideration of the construction and operation of a transmission of this character may be found in my said copending application Serial No. 748,382, now patent No. 2,645,137, previously mentioned, but it will be appreciated that if all of the friction clutches and brake bands are released, rotation of the pump 1 by the engine will rotate the turbine 2 and thereby the internal toothed gear 7 of the front planetary gearset. Both sun gears 18 and 23 may turn freely and there is accordingly no reaction member for either sun gear. Under these conditions, the rear planet carrier 12 which is directly coupled to the propeller shaft remains stationary, and the rear sun gear 23 and brake drum 26 are rotated in a reverse direction. The transmission is accordingly in neutral and no drive can be transmitted to the rear wheels. If now the rear brake band 27 is applied to arrest rotation of the drum 26, both sun gears 23 and 18 will be stopped and held against rotation as the rear overrunning clutch 28 and the forward overrunning clutch 25 prevent a drive in the reverse direction. The reaction from the forward sun gear is accordingly transmitted to the hub of the rear sun gear by way of overrunning clutch 25, and drum 24, and thence to band 27 and the transmission case by way of overrunning clutch 28 and drum 26. The reaction of the rear planetary gearset is transmitted directly to the anchored band 27 by way of overrunning clutch 28 and drum 26. At the lower driven shaft speeds, therefore, the drive is transmitted from the hydrokinetic torque converter by way of turbine 2 and internal ring gear 7 to the front planet carrier 9 which is turned forwardly at a reduced speed as the planet gears 22 are rolled upon the gear 18. The drive from the planet carrier 9 is conveyed by way of sleeve 9a and drum 10a to the rear internal toothed ring gear 10 which rolls the planet gears 37 upon sun gear 23, thereby rotating the rear carrier 12 at a further reduced speed so that a double reduction is imparted to the driven shaft 13.

If the clutch unit 20 is engaged by suitable means presently to be considered in greater detail, the disks 15, 33 are forced together and the front planetary gear unit is locked up, as previously explained. The only gear reduction then remaining is that afforded by the rear planetary gearset. The front sun gear 18 now overruns the rear sun gear 23, this action being permitted by the overrunning clutch 25.

If, after the speed of the vehicle has increased and the torque demand has fallen away sufficiently, the front or direct drive clutch 14 is engaged, the driven shaft 13 is directly coupled to the crankshaft 6 to provide a positive direct two-way drive with engine braking at the 1–1 ratio. All the transmission components of a rotary character may thereafter turn together, with the exception of the drum 26 which remains held by the band 27, in the preferred arrangement herein under consideration, although it will be appreciated that the system could be modified in such a manner as to release the drum 26 in direct drive.

A low-speed, two-way drive with engine braking is available by engaging the band 21 with the drum 19, the friction clutches 14, 20 being released. Both sun gears are thereby held against rotation. The front sun gear is directly connected to the drum 19, and the rear sun gear 23 is held against rotation by the overrunning clutch 25 as the rear sun gear will tend to rotate forwardly or clockwise, as viewed from the left in FIG. 1, thereby locking the overrunning clutch unit 25.

Reverse drive is established by engaging the brake band 17 with the drum 16 to hold planet carrier 9 against rotation, clutches 14, 20 and brake bands 21, 27 being released. Front planet gears 22 will then rotate upon their pins, turning the front sun gear 18 in a reverse direction. Front sun gear 18 will then drive the rear sun gear 23 in a reverse direction through the overrunning clutch 25, which will roll the rear planet pinions 37 rearwardly at reduced speed upon the stationary internal toothed gear 10, which is also held against rotation by the engagement of brake band 17.

Two sources of fluid under pressure are provided, one comprising a front or engine-driven pump 50, drivable by means of a gear 52 which turns as a unit with the driving element 1 of the hydraulic torque converter, and the other comprising a rear pump 54, the speed of which is proportional to that of the car, and which may be driven by a gear 55 secured to the output shaft 13. It will be appreciated by those skilled in the art that in the practical construction of such a transmission, the front pump 50 is usually larger than the rear pump 54, so that more power is inherently required to drive the front pump than the rear pump. A manually operable control lever is provided, shown as having four positions, designated N for neutral, F for forward (which is the normal driving position), LU for lockup (emergency low gear), and R for reverse.

Figure 2:
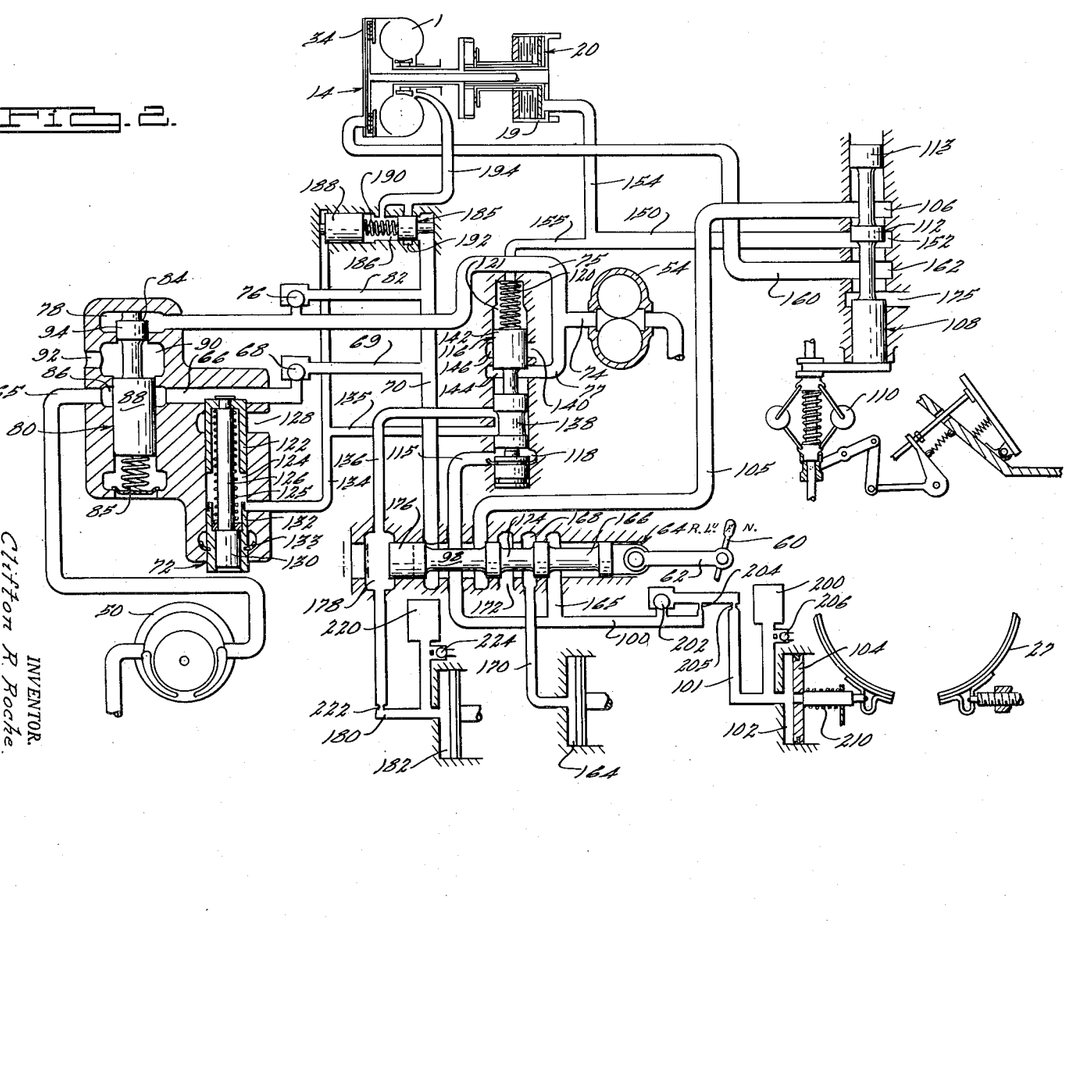
FIG. 2 is a hydraulic digaram.

The lever 60 is connected through suitable linkage 62 with a selector valve 64 which is thereby movable to four positions corresponding to those just designated. FIG. 2 shows the system with the transmission in forward and neither pump delivering pressure.

When the engine is started, the front pump 50 delivers pressure through conduit-passage portions 65, 66, check valve 68 and conduit 69 to a conduit 70, which may be termed the line-pressure supply conduit, or "main line." The pressure of the front pump is adapted to be maintained at a predetermined value, for example, in the neighborhood of 80 p.s.i. by a front pump pressure relief valve assembly, generally designated 72.

When the car begins to move, the rear pump 54 delivers fluid under pressure through conduits 74, 75, check valve 76 and conduit 82 to the main line 70. At the same time pressure is delivered from the rear pump to a port 78 formed at the end of a slidable piston-type combined dump valve and pressure relief valve assembly, generally designated 80. It will be seen that fluid from the rear pump cannot unseat check valve 76 and enter the main line 70 until the pressure developed by the rear pump exceeds that developed by the front pump, since the pressure delivered from the front pump, acting through branch passage 82, tends to maintain the check valve 76 closed against rear pump pressure.

When the pressure from the rear pump, as the result of increasing car speed, builds up to a value exceeding that being delivered to the line 70 by the front pump, the rear pump check valve 76 will unseat, and the pressure from the rear pump will enter the main line and react in a closing direction, through branch conduit 69, upon the front pump check valve 68, closing such check valve. The main line pressure will then be supplied by the rear pump, but the front pump will continue to supply pressure at a value determined by the relief valve 72 until the rear pump pressure builds up to some predetermined higher value, which may for example be in the neighborhood of 81 p.s.i. Such higher rear pump pressure acting upon the head 84 of the valve element 88 will urge such valve downwardly, as viewed in FIG. 2, against the effort of its spring 85. The conduits 65, 66 from the front pump are arranged to conduct the front pump output through an annular chamber 86 in the body of the valve assembly 80, but such chamber is ordinarily sealed by the lower spool of valve element 88 when the valve is in the raised position under the influence of the spring 85. When valve 88 moves downwardly in response to the increased (e.g. 81 p.s.i.) rear pump pressure, however, the lower spool of valve element 88 moves downwardly sufficiently to open communication between valve chamber 86 and another valve chamber 90 which is vented to sump as through the vent port 92. Such increased rear pump pressures therefore act to dump the output of the front pump so that during continued operation of the vehicle at higher speeds and lower fluid demands all load upon the front pump is relieved and the power of the engine is thereby conserved.

When the pressure of the rear pump increases to a still higher value, an upper spool 94 of the valve 88 moves downwardly far enough to open communication between valve chambers 78, 90, to allow escape of the excess rear pump oil, and thereby to maintain the pressure of the rear pump output at a desired value which may for example be in the neighborhood of 83 p.s.i.

If at any time the fluid demand rises above the output of the rear pump, the resultant drop in pressure allows the valve 88 to rise until the output of the front pump is no longer vented and the output of the front pump can then augment that of the rear pump for the duration of such extra demand. The parts may be arranged so that this will occur when a clutch such as 19 and/or 14 is engaged, and this provides a momentary extra fluid supply which prevents any danger of unwanted slippage of the forward brake band or the clutch.

The action thus far described ordinarily occurs with the selector valve 64 in the forward position. During reverse operation of the vehicle, the rear pump cannot draw fluid from the system because reverse operation of the pump immediately causes the check valve 76 to close, the relief valve 80 stays in the up position and the fluid is supplied by the front pump.

It will be observed that when the selector valve is in the normal forward driving or F position, the main pressure supply line 70 communicates through a chamber formed by a neck portion 98 of the valve 64 with a conduit 100 which leads to actuating means for the forward drive brake band 27. Such forward drive brake band actuating means includes a cylinder 102 and piston 104. Other features of the actuating means for this brake band will presently be considered.

It will also be observed that in forward position the selector valve provides communication between the line pressure source and a conduit 105 leading to a port 106 of a governor-operated valve 108. The governor valve 108 may also be of the balanced spool-type. The governor 110 may be driven at a speed corresponding to that of the vehicle and the action of the governor upon the valve may be modified, if desired, by suitable controlling means which is influenced by the degree of throttle opening and/or other factors as may be desired. The governor mechanism will presently be discussed in greater detail, although a more complete consideration of the action of such a governor system will be found in my said copending application Serial No. 93,355 previously mentioned. The specific character or pattern of governor action is subject to variation without departing from the present invention, as will be understood.

At low car speeds, the pressure fluid delivered to chamber 106 of the governor valve body is trapped between the central and upper spools 112, 113 of such valve, as shown in FIG. 2.

At all times while the selector valve is in either the forward or lockup positions, line pressure is also delivered through a conduit 115 to the lower end of a pressure increase regulating valve assembly generally designated 116. Pressure increase regulating valve 116 is also of the slidable type, conduit 115 communicating with a port 118 at the lower end of the valve, as it is shown in FIG. 2, so that the pressure delivered through conduit 115 tends to raise the valve against the effort of a compression spring 120 acting against the opposite end of the valve.

The front pump relief valve 72 includes a piston 122 slidable in a cylinder 124 and urged upwardly against front pump pressure by a compression spring 125 which encircles a slidable rod 126 upon which the piston 122 is carried. When the piston is moved downwardly far enough, it exposes a vent port 128 through which fluid from the front pump can escape to the reservoir. The spring and piston are so proportioned that their combined effect is such as to tend to maintain front pump pressure in the neighborhood of 80 p.s.i., but means are provided for augmenting the upward effort exerted by the spring 125 so that such valve will tend to maintain the front pump pressure at a higher value, for example at 160 p.s.i., when the augmenting means is in operation. The augmenting effect is derived from line pressure, which is conducted to the cylinder 124 beneath the piston 122 at certain times to increase the upward effort upon the piston. The lower end of the piston rod 126 carries a head 130 which is substantially smaller than the piston 122 so that fluid delivered to the cylinder 124 under pressure exerts more force upwardly on the piston and rod assembly than downwardly. The head 130 is guided in a sleeve 132 positioned in the lower end of the cylinder 124 by a key 133 and serving also as an abutment for the lower end of the spring 125.

When the selector valve is in any position other than reverse, and the pressure increase regulating valve 116 is in the lowered position, the cylinder 124 is vented through conduits 134, 135, 136. When the pressure increase regulating valve is in lowered position, the conduits 135, 136 are connected by a reduced neck section 138 of valve 116 and the conduit 136 is vented through the open left end of the casing of selector valve 64. When the transmission is operating in low gear, the fluid delivered to bottom chamber 118 of the pressure increase regulating valve 116 lifts such valve far enough to establish communication between conduits 115, 135. Fluid pressure is thereupon delivered through conduits 135, 134 to the cylinder 124 to increase the regulated pressure of the front pump output established by the front pump relief valve 72. At the same time, the output of the rear pump is vented through a vent port 140 by reason of the fact that the top spool portion 142 of the pressure increase regulating valve 116 rises to establish communication between a port 144 connected to the rear pump output and a port 146 connected to the vent port 140. Port 144 is connected to the rear pump output conduit 74 by a branch conduit 77. It will be understood, therefore, that while operating in low gear the fluid supply is entirely from the front pump, and that the pressure applied to the brake band 27 is substantially increased at this time, which is desirable because of the high torque loads which are apt to be encountered in low gear.

When the speed of the vehicle has increased sufficiently to cause the governor 110 to move the valve 108 downwardly far enough, communication is established between the conduit 105 and a conduit 150 leading from a port 152 of the valve 108 to a pair of branch conduits 154, 155, conduit 154 leading to the actuating cylinder or drum 19 of the lockup clutch 20 for the front planetary gear unit. Branch conduit 155 leads to the upper end of the cylinder in which the pressure increase regulating valve 116 is slidable. When the valve 108 establishes communication between the conduits 105, 150, therefore, fluid at line pressure is delivered to the clutch 20 to establish the second speed drive, and at the same time pressure is delivered to the chamber 121 at the upper end of the valve 116 to offset the effect of the fluid pressure being delivered to the chamber 118 at the lower end of such valve. The valve 116 accordingly moves downwardly under the influence of spring 120, venting the augmenting chamber 124 of the front pump relief valve 72 to atmosphere through the open port 178 at the left end of the selector valve casing in the manner previously described and closing the vent 140 to allow the rear pump to build up pressure and take over the fluid supply from the front pump in the manner previously described when the rear pump pressure rises to a sufficient value.

When the speed of the vehicle has again increased sufficiently, the governor valve 108 moves downwardly to the position to establish communication between the conduit 105 and the conduit 160 which extends from a port 162 in the casing of valve 108 to the fluid supply conduit 151 leading to the actuating cylinder 34 for the direct drive clutch 14. In such position the valve also maintains communication between conduit 105 and conduit 150. Engagement of the direct drive clutch 14 establishes direct drive through the transmission in the manner previously described.

When the selector valve is moved from the normal forward drive position shown in full lines in FIG. 2, one step to the left, to the lockup position, the conduit 105 is cut off and fluid is delivered to the actuating cylinder 164 for the lockup brake band 21, such fluid traveling from conduit 70 through the chamber provided by neck portion 98 of the selector valve, conduit 100, branch conduit 165, and through another neck portion 166 of the valve to a port 168 to which a conduit 170 is connected leading to the cylinder 164. Conduit 105 is at the same time connected to a vent port 172 by by a neck portion 174 of the selector valve. The pressure in the conduits 160, 150 and connected cylinders can thus vent through outlet 172 even if the governor valve has not again risen to a position to connect the conduits 150, 160 to the vent port 175 of the governor valve. It will be appreciated that the pressure on top of the pressure increase regulating valve 116 is thereby relieved, but that pressure is maintained on the lower end of such valve, so that the valve 116 thereupon rises to dump the rear pump and again apply augmenting pressure to the lower end of the front pump relief valve piston 122 so that the front pump can build up to high pressure to maintain increased pressure upon the lockup brake band 21 and forward drive brake band 27 to accommodate the high torque loads that may be encountered during the lockup low speed drive.

When the selector valve is moved all the way to the left to the reverse position, a spool 176 at the left end of the selectcor valve closes the left end of the valve casing and communication is established through the neck portion 98 between the line 70 and port 178 in the valve casing. A conduit 180 leads from the port 178 to the actuating cylinder 182 for the reverse drive brake band 17. The conduit 136 is also connected to valve chamber 178, as previously noted, so that fluid at line pressure is also delivered to the pressure increase regulating valve, which is then in the down position, so that such fluid pressure passes through the neck 138 of the pressure increase regulating valve to the front pump relief valve cylinder 124 by way of conduits 135, 134. As previously explained, this increases the front pump fluid pressure and accordingly provides for firm engagement of the reverse drive brake band, to insure adequate engaging pressure to handle the high torque loads which are apt to be encountered in reverse. It will be understood that during reverse operation the rear pump is not delivering pressure but that any tendency of the rear pump to draw oil from the system while turning backwards is prevented by check valve 76.

In order to maintain proper pressure in the hydrokinetic torque converter, which may operate at a lower pressure such for example as a pressure in the neighborhood of 27 p.s.i., a fluid connection may be provided from the main fluid line 70 to the converter through a regulating valve 185 which comprises a piston member movable in a cylinder 186 which is connected at one end to the main conduit 70 and at the other end to the conduit 134. A second piston 188 is arranged between the piston 185 and the end of the cylinder to which the conduit 134 is connected, the portion of the cylinder containing the piston 188 being somewhat enlarged and a helical compression spring 190 being trapped between the two pistons 185, 188. A port 192 in the side of the cylinder somewhat spaced from the right end to which the main line 70 is connected communicates with conduit 194 leading to the hydraulic torque converter and the parts are so porportioned that when the main line pressure is approximately 80 p.s.i. and the conduit 134 is vented, piston valve 185 maintains a pressure of 27 p.s.i. in the line 194 leading to the hydraulic torque converter. When the pressure in the main line conduit rises to 160 p.s.i., such pressure is also delivered to the conduit 134, as previously explained, and bears against piston 188 and spring 190 to increase the effect of such spring, urging the valve 185 to the right with increased effort so that the effect of the increased pressure in main line 70 is counteracted and the valve 185 still functions to maintain the desired pressure in the hydraulic torque converter.

Means are preferably also provided for preventing sudden jarring engagement of the brake bands. When the car is standing with the engine running and the selector valve in the neutral position, forward drive brake drum 26 is rotating rapidly in a reverse direction. Under such conditions, it is difficult to stop the brake drum from rotating without an unpleasant jar. I have overcome this difficulty, however, by means including an airtrap pressure dome 200 which is located above the oil level in the transmission, and which is connected to conduit 101 leading to the actuating cylinder 102 for the forward brake band 27. The conduit portions 100, 101 are connected through a ball check valve 202 which opens in the direction of in-flow of fluid during application of the brake band. The conduits 100, 101 are also connected through a relatively small bleed orifice 204, and another restricted orifice 205 is also formed in the conduit 101. A ball check valve 206 is also connected to the pressure dome and located at a position above the oil level in the transmission, the ball being arranged to fall to the open position to provide a vent for the dome when there is no pressure in the dome, but to be urged to a closed position when there is pressure in the dome and connected conduit systems.

When the selector valve is moved to the forward drive position, line pressure unseats the check valve 202 and inflow to cylinder 102 is at a rate determined by the orifice 205. This rate is fast enough to cause the brake band to move rapidly into engagement with the drum, since the brake band releasing spring 210 is a light spring, but such initial engagement of the band is without sufficient pressure to stop rotation of the drum. As the fluid continues to enter through the orifice 205, however, it builds up the pressure in the dome 200 and connected systems, gradually increasing the pressure exerted against the drum by the band 27 so that the drum is stopped relatively gradually without jolting.

With the car standing still and the brake band 27 holding the drum 26 stationary, the other two brake drums 16 and 19 are also stationary. In order to engage the reverse without objectionable jarring, I preferably arrange the parts in such manner that in shifting the selector valve from the forward position to the reverse position, the reverse drum is prevented from rotating before engagement of the band 17. This is accomplished by delaying the disengagement of the forward drum brake band 27 until the fluid has had time to enter the reverse band actuating cylinder 182. Upon such movement of the selector from the forward position to the reverse position, the fluid line pressure enters the reverse cylinder and at the same time the forward drive band actuating cylinder 102 is connected to drain through the selector valve, but in order to escape from the forward speed cylinder the fluid must pass through the small bleed orifice 204 as the ball check 202 will be seated at this time. During the interval required for the fluid to escape through the bleed orifice 204, the pressure in the dome 200 tends to maintain an engagement pressure in the cylinder 102, and these parts are so proportioned that the band 27 thereby holds the drum 26 stationary for a period long enough to allow the reverse drum to engage.

With the shift pattern shown wherein the selector valve moves through the forward speed position during its travel from neutral to reverse, it will be understood that the necessity of placing the selector valve in the forward position in order to reach the reverse position provides for arresting of the forward drive brake drum 26 and that this stops the other brake drums as previously noted so that the subsequent engagement of the reverse brake band 17 is accomplished without jarring. It will be understood, however, that with a different shift pattern, or to permit quicker shifting to reverse, a similar pressure dome of the air-trap type corresponding to the dome 200 might also be provided in the pressure line 180 leading to the reverse cylinder 182, and that similar provision might also be made in conjunction with the conduit 170 leading to the lockup cylinder 164, if desired.

The ball check valve 206, as previously stated, is also located above the oil level in the transmission case and allows the fluid to drain when the forward band is disengaged. This valve also prevents the pressure dome from drawing oil from the system as the system cools down when the car is not in use. If such a provision were not made, the cooling of the air in the dome, by reducing the pressure in the dome, would tend to draw oil from the system.

In order to eliminate the necessity for pausing with the shift lever in the forward drive position during shifting from neutral to reverse, to allow time for the pressure to build up in the dome 200, a separate pressure dome 220 may be provided, connected to the conduit 180 leading to the actuating cylinder 182 for the reverse drive brake band 17; a restriction designated 222 also being provided in the conduit 180 between valve chamber 178 and the point of connection of the pressure dome. The pressure dome may be similar in construction and arrangement to the pressure dome 200 previously described, and an inwardly opening check valve 224, similar to the check valve 206, is also provided connected to the conduit leading to the dome, and located above the liquid level in the transmission. It will be appreciated that incorporation of the dome 220 and check valve 224 permits easy and quick shifting to reverse without objectionable noise or clashing, and without the necessity for pausing momentarily in the forward ratio.

The control system diagrammatically shown in FIG. 3 is essentially similar to that of FIG. 2, and parts corresponding to those already described are designated by like reference characters and will require no detailed re-description. A somewhat modified pressure dome arrangement is provided adapted to prevent objectionable rapid grabbing of all of the brake drums and clutches, the pressure domes 200 and 220 previously described being eliminated.

A single pressure dome 230 is employed in this embodiment, connected to the main line 70, and a restriction 232 is incorporated in the main line between the point of connection of the pressure dome and the point of connection of the conduits 69 and 82 from the front and rear pumps, respectively. A check valve 234 is also provided in the conduit 235 which serves to connect the pressure dome 230 to the main line 70. The pressure dome 230 and orifice 232 are so proportioned with respect to the fluid capacity of the actuating cylinders for the brakes and clutches and of the connecting conduits, that when fluid connection is effected to any one of the actuating cylinders, the initial in-flow of fluid thereto is furnished by the pressure dome 230 and during such initial in-flow, the pressure in the dome falls away more rapidly than it can be maintained through the restriction 232, and drops to a value substantially below line pressure. For example, pressure in the dome during that part of the travel of the applying means which carries the band or clutch plates into initial engagement may fall to approximately 30 p.s.i. Such initial movement of the clutching or braking parts into engagement with one another is rapid, but the initial pressure exerted is light, due to the pressure drop in the dome. Thereafter, the pressure must build up in the entire system, including the dome, through the restriction 232, in order to fully apply the clutch or brake, and it will be appreciated that this requires a predetermined time which is designed to be sufficient to prevent objectionable grabbing or noise. In the intervals between the shifts the pressure builds up in the dome.

Oil in the dome 230 is under continuous pressure during all operating conditions and if it were not for the drain valve 234, there would be no escape for the oil in the dome even when the system was not operating. Under such conditions the air in the dome might, in time, become completely absorbed by the oil so that the oil would fill the pressure dome and the dome, with no air cushion in it, would be completely ineffective. The drain valve 234, located below the dome but above the fluid level in the transmission case, allows new air to be supplied to the dome whenever the system is not in operation. At such time, the pressure will drop and the weight of the valve 234 will remove it from its seat thereby opening the valve. This allows air to be drawn through and the oil to drain out. Thus the volume of air in the dome is maintained according to the location of the drain valve 234.

In order to eliminate the tendency of the pressure relief valves to vibrate, dash pot means may be provided to slow their movement. In the case of the rear pump pressure relief valve and dump valve assembly, which is designated 88a in FIGURE 3, a cylindrical extension portion 240 is formed on the upper end of the casing and the valve element is provided with an upward extension 242 carrying at its top a piston portion 244 slidable in the cylindrical extension 240. Such cylindrical extension communicates terminally with the chamber 78a to which the conduit 75 from the rear pump is connected, and a small bleed hole 245 forms a restricted by-pass through the piston 244, the cylindrical extension 240 being closed at its outer end so that these parts serve as a dash pot to control the rate of movement of the valve element 88a.

The dash pot means for the front pump pressure relief valve comprises a downwardly-extending cylindrical extension 250 formed integrally with the sleeve 132a, corresponding to sleeve 132 of the embodiment of FIG. 2. The cylindrical extension 250 is closed at its bottom but is provided with a hole 252 in its side, which is located below the oil level in the transmission so that the space within the cylinder 250 may always be fed with oil from the sump. A reduced extension or neck 254 of the enlarged head 130a of the piston rod 126 carries a piston 255 which is slightly smaller than the internal diameter of the cylinder 250 so that restricted leakage past the piston portion 255 can occur. The hole 252, reduced portion 254, and piston portion 255 are so located that the piston portion 255 moves below the hole 252 as the top of piston 122 commences to open communication between passage 66 and relief port 128. Fluid which leaks past the piston 255 can therefore move in and out of the space surrounding the neck 254 through the hole 252, and the restriction imposed upon such fluid movement by the relatively close fit of the piston 255 causes a dash pot effect to dampen the movement of the relief valve piston.

It will also be perceived that in the embodiment of FIG. 3 the passage means, designated 115a, for providing pressure connection to the chamber 118a at the lower end of the pressure increase regulating valve, is connected to the selector valve body portion near the right end of the latter, in a position such that when the selector valve is in the neutral position, the chamber 118a is vented to the sump through a vent port 260 in the selector valve body, communication between passage 115a and vent port 260 being effected by the neck 166 of the valve. When the valve is moved to the forward speed position shown in FIG. 3, neck 166 provides communication between passage 115a and branch passage 165 which is connected to the line 100 leading to the forward drive brake cylinder 102. At the same time neck 98 provides communication between the main line 70 and conduit 100, so that pressure fluid is delivered to the cylinder 102 and also to the pressure increase regulating valve chamber 118a from the main line through neck 98, conduit 100, branch passage 165, neck 166, and conduit 115a. As previously explained, this delivers augmented pressure to the front pump relief valve cylinder 124 to increase the effective output pressure of the front pump.

When the selector valve is moved to the lockup position, the spool at the right end of the valve 64, which spool is designated 162, moves to the left of the passage 115a as the parts are shown in FIG. 3, venting such passage to atmosphere so that the pressure-augmenting effect is not provided with the selector valve in the lockup setting.

When the selector valve is moved all the way to the left, to the reverse position, the main line 70 is connected to valve chamber 178 which, as in the previous embodiment, is connected both to the reverse brake cylinder 182a and to the conduit 136 through which fluid is delivered to the pressure-augmenting cylinder 124 of the front pump relief valve to raise the effective output pressure of the front pump, as previously described.

In this embodiment, also, it will be noted that the pressure-regulating valve, designated 116a, is somewhat modified in that it does not incorporate means for dumping the output of the rear pump as in the previous embodiment. With this arrangement, when operating with the selector valve in forward drive position and the car running in low gear, the rear pump pressure builds up in the chamber 78a of the rear pump relief valve as the car accelerates and when the rear pump pressure reaches the neighborhood of 81 p.s.i., it dumps the front pump (although the effective output pressure of the front pump is at that time 160 p.s.i.). If the car continues to accelerate, the rear pump thereafter furnishes the fluid supply as the front pump pressure falls away, the check valve 68 being closed and the check valve 76 opened as the rear pump takes over the fluid supply function.

It will be appreciated that when the shift to intermediate speed occurs, fluid pressure is delivered to the top of the pressure increase regulating valve chamber through conduit 155, allowing the pressure-regulating valve to close communication between the fluid supply source and the pressure-augmenting chamber 124 of the front pump pressure relief valve, as previously described. This arrangement is suitable for use where such a transmission is installed in a vehicle having a relatively low-powered engine, wherein the torque multiplication of the torque converter is substantially reduced at the upper speed ranges reached in low gear, so that in such ranges the brake band 27 is capable of handling the torque loads without the provision of augmented pressure in the brake cylinder 102.

It will be appreciated that if from engineering or other considerations it is desired to reduce the pressures in and exerted by the brake-applying cylinders, more than a single cylinder may be employed to apply each brake band. For example, as shown in FIG. 3, the cylinder 182a is arranged in coaxial relation with a second cylinder 182b, and the actuating fluid is adapted to be simultaneously delivered to both such cylinders through the conduit 180a. The cylinders are shown as of different diameters, although this is subject to variation. The cylinders are separated by a transverse partition 275, and when fluid is delivered to cylinder 182b to move the piston 276 therein to the right, a rod 278 connected to such piston and projecting slidably through the wall 275 bears against the piston 280 in cylinder 182a to augment the effort exerted on piston 280 by the fluid in the last-mentioned cylinder. A rod 282 connected to piston 280 is connected to the reverse drive brake band 17 to actuate the same. A vent, indicated in dotted lines at 302, drains the compartment 303 in the cylinder 182b between the piston 176 and the partition 275.

It will be understood that the valves and individual features of arrangement illustrated in the system of FIG. 2 may be substituted for the corresponding valves and features in the system of FIG. 3, and vice versa, and that various arrangements for the pressure dome may be employed. For instance, as an example, with the system illustrated in FIG. 3, the pressure increase control valve illustrated in FIG. 2, may be used, and in addition to the pressure dome 230 of FIG. 3, either or both pressure domes 200 and 220 may also be used in the system depending upon the displacement of the cylinders and the characteristics of the band, friction material, and other requirements. With such a system where the bleed 232 is present, it may be unnecessary to use the bleeds 222 and 205. Also, if desired, the ball check 202 and the bleed 204 may be eliminated, in which case the conduit 100 could be directly connected with the conduit 101.

If it is only desired to increase pressure in the reverse cylinder, the pressure increase valve may be eliminated entirely and conduit 136 directly connected with conduit 134 to provide a direct connection from valve chamber 178 to space 124 beneath the pressure regulating valve piston 122. With such arrangement, the output pressure of the front pump remains constant (unless dumped at the valve 80) until the selector valve 64 is moved to the reverse position, which diverts pressure from the main line 70 through conduits 136, 134 to the chamber 124.

Figure 4:
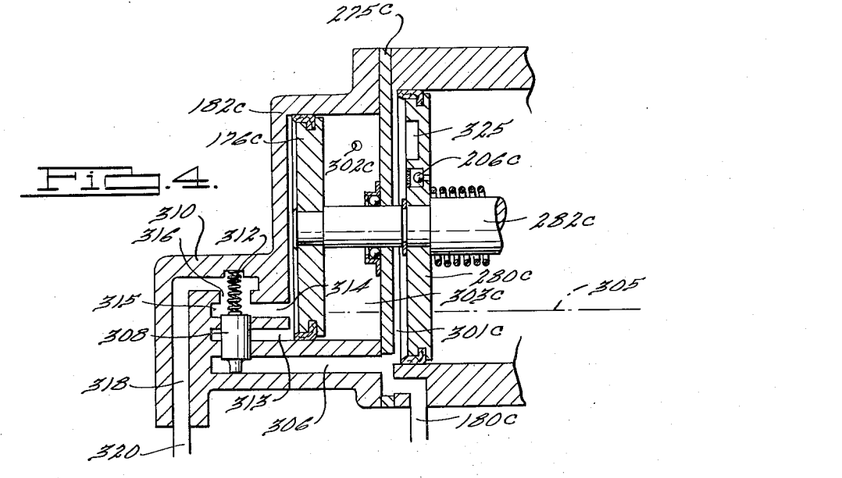
FIG. 4 is a longitudinal sectional view of a somewhat modified actuating servomotor construction.

In FIG. 4, I have shown a modified double piston-type servomotor. One such servomotor may be employed to actuate each brake band of the transmission or, as will be understood, different types of servomotors may be employed if desired. The servomotor disclosed in FIG. 4 is so constructed as to incorporate an inherent cushioning action, so that separate pressure domes are not required, although if desired a single central pressure dome such as the dome 230 of FIG. 3 may be employed in conjunction with servomotors of the type of FIG. 4, and this would improve the operating characteristics of the disc clutches.

The servomotor assembly is so positioned in the transmission that the normal oil level in the transmission is near the bottom of the servomotor cylinders, for example, the oil level might be approximately at the position indicated by the broken line 305. The general arrangement of the cylinders will be seen to substantially correspond to the showing of the double cylinder servomotor construction provided for actuation of the reverse drive brake band in the embodiment of FIG. 3, and corresponding parts in FIG. 4 are designated by like reference numerals distinguished by the addition of the letter c. The fluid is delivered first to the cylinder 301c through conduit 180c, which may correspond to and be supplied in similar fashion to the conduit 180a of FIG. 3. The fluid is also adapted to be conducted through internal passages as 306 to a normally closed piston-type check valve 308 which is slidably mounted in an extension body portion 310 formed upon the head of the cylinder 182c. One end of the valve 308 is exposed to the inlet pressure in the passage 306, while a compression spring 312 acts against the other end of the valve to yieldably hold it in a position to close off the passage 306. The biasing effect of the spring 312 may be so calibrated that in response to a predetermined pressure, for example 70 p.s.i., the valve 308 is lifted to establish communication between passage 306 and a valve outlet passage 313 which leads to the interior of the cylinder 182c at the outer end of the cylinder. The pressure thus delivered to cylinder 182c can act upon piston 176c, which is mounted upon the same stem 282c which carries the piston 280c. It will be noted that in this embodiment both of the pistons 280c and 176c are fast upon the same stem 282c. It will also be understood that the stem 282c may be mechanically connected to and serve to actuate the reverse drive brake band, or any other of the brake bands of the transmission which the servomotor is to operate. Of course the servomotor may be employed to actuate any other device suitable to be driven by such a device.

Another passage 314, formed in the head of cylinder 182c and also in the extension 310, is connected to a port 315 which is adapted to be closed by the valve 308 when the valve is raised to the position it occupies when opened under increased pressure to establish communication between passageways 306, 313 in the manner stated. When the valve 308 is in its lowered or inlet closed position shown in FIG. 4, however, passageway 314 and port 315 establish communication between the interior of cylinder 182c and the sump, through the spring chamber portion 316 at the upper end of the valve and an outlet passage 318, which is in turn connected to a conduit 320 which extends to the oil sump and terminates below the liquid level therein.

Considering the operation of the portions of this modified servomotor thus far described, it will be noted that when the control system calls for actuation of the servomotor, and fluid is delivered to the inlet thereof through the conduit 180c, movement of the piston 280c (to the right, as the parts are shown in FIG. 4) occurs while the valve 308 remains closed and while the fluid pressure remains relatively low. This is because much less pressure than 70 p.s.i. is required to move the piston through the initial travel required to bring the band into engagement with the drum. During such initial travel, piston 280c also acts through stem 282c to move the piston 176c to the right. It will be appreciated that this travel occurs through a distance sufficient to establish initial engagement between the band and drum. During such initial travel, the movement of piston 176c to the right tends to reduce the pressure in the cylinder 182c, and draws hydraulic fluid into such cylinder from the sump through conduit 320 and passageways 318, 316, 314. The fluid delivered from the pumps through inlet conduit 180c is therefore not required to fill the auxiliary cylinder 182c, and faster application of the brake is thereby achieved. After the initial engagement, the pressure builds up in cylinder 301c and the passageway 306. The valve 308 is thereby lifted in the manner previously described, and opens the passage 313 and closes the port 315, thereby trapping in the cylinder 182c the oil which has been drawn thereinto from the sump. Fluid then enters cylinder 182c from inlet conduit 180c via passageway 313, and this additional fluid need only be supplied in relatively small volume, due to pre-filling of cylinder 182c from the sump. Full pump pressure is therefore effective almost immediately to urge the piston 176c to the right.

The servomotor of FIG. 4 is also so constructed that an air cushion effect, the action of which is analogous to that of the pressure domes previously described is achieved within the cylinder itself. As stated previously, the double cylinder and piston assembly is mounted so that the normal oil level therein is relatively low, as indicated at 305. A check valve 206c is provided in the piston 280c, located above the liquid level and opening inwardly, that is, into the cylinder space 301c, but adapted to be closed by the pressure within such cylinder during fluid-induced actuation of the piston. If a larger air chamber is desired than the cylinder space affords a part of the head wall of the piston 280c may be hollowed out, as indicated at 325, in the region above the liquid level, to increase the air space above the liquid level in the cylinder. It wil be observed that by virtue of this arrangement as soon as fluid under pressure is delivered to the cylinder 301, the pressure tends to close the check valve 206c and to build up in the cylinder, compressing the air in the upper portion of the cylinder. Since it requires only relatively slight pressure (e.g. 10–12 p.s.i.) to move the brake band through its initial travel up to the position at which it first engages the drum, the piston 280c moves to the right while the pressure is still low and very soon after the first delivery of oil to the cylinder, the cushion being maintained by the trapped air as the piston travels through such initial movement. As soon as movement of the band is arrested by its engagement with the drum, however, the pressure builds up in the cylinder and compresses the trapped air, which damps the rate of increase of working pressure transmitted to the band, and imparts desired characteristics thereto, insuring smooth engagement and eliminating the sudden grabbing action which causes lurching of the vehicle in some systems of this general class. Although no such controlled trapped cushioning action takes place in the auxiliary cylinder 182c itself, the cushioning effect of the trapped air in the upper portion of the cylinder 301c is also effective to control the rate of pressure rise in the auxiliary cylinder 182c.

The space 303c between the piston 176c and the partition 275c is vented through an escape passage 302c.

It will be understood that when the pressure in the conduit 180c and connected portions of the servomotor is relieved, as by movement of the selector valve to a position to vent the conduit 180c, the check valve 206c can open as the liquid level falls in the cylinder 301c.

Figure 5:
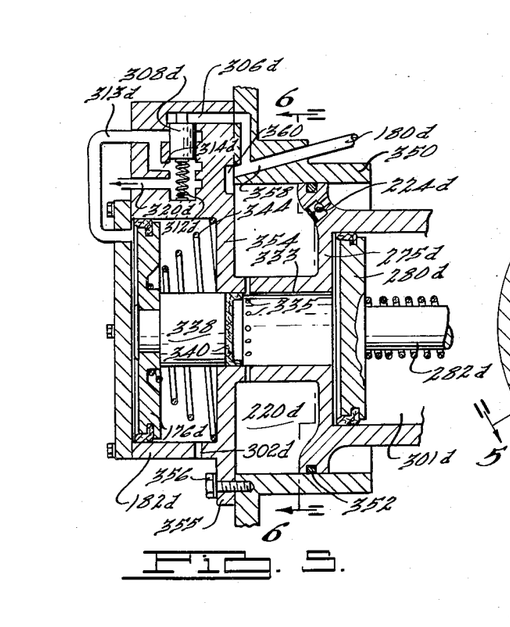
FIG. 5 is a horizontal sectional view of another modified servomotor construction, taken substantially on the line 5—5 of FIG. 6.

In FIG. 5, I have shown a further modified servomotor construction wherein hydraulic means for multiplying the engaging pressure applied to the brake band is derived from a hydrostatic multiplier, the action of which is basically similar to that of the familiar hydraulic jack or lift. As in the case of the previous embodiments, a main piston 280d is provided, movable in a cylinder as 301d which may be incorporated in the side of the transmission case, the piston being connected as through the agency of its stem 282d to the brake band which is to be engaged in response to movement of the piston inwardly or to the right as the parts are viewed in FIG. 5.

In this embodiment also, parts analogous to those previously described are designated by like reference numeral distinguished by the use of the letter d after each.

The fluid is supplied through a conduit 180d, and again it should be noted that although in the hydraulic diagrams, FIGS. 2 and 3, the numeral 180 has been applied to the conduit leading to the reverse brake band actuating servomotor, the same type of servomotor mechanism may be used to actuate any or all of the other ratio controlling brake bands. The line 180d is connected through a restricting slot 360 to a cushioning chamber or pressure dome 220d which is defined by an annular space surrounding the high pressure cylinder 333, the arrangement and operation of which will presently be considered, and a check valve 224d opens inwardly with respect to the cushioning chamber. The cushioning chamber 220d is connected through an annular series of relatively small holes 335 to the interior of the small cylinder 333, which is formed as a cylindrical rearward coaxial extension of the head of cylinder 301d. Cylinder 333 constitutes a high pressure cylinder.

At its outer end the high pressure cylinder 333 is enlarged and continues integrally outwardly to define a second low pressure cylinder 182d which contains the auxiliary low pressure piston 176d. A high pressure piston 338 is slidable in the high pressure cylinder 333 and projects into the auxiliary low pressure cylinder 182d where it is secured to the piston 176d. At its free end within the high pressure cylinder, the high pressure piston 338 carries a flexible sealing cup 340. When the connected pistons 176d, 338 are in the fully retracted position shown in FIG. 5, the cup 340 uncovers the holes 335, but when these connected pistons move forwardly the cup 340 closes the holes 335 so that communication between the fluid supply conduit 180d and the main low pressure cylinder 301d is cut off during forward travel of the high pressure piston.

A branching extension 306d of the supply conduit 180d leads to a piston-type check valve 308d, the general arrangement and action of which are similar to those of the valve 308 of the embodiment of FIG. 4. When the pressure in the supply conduit rises to a predetermined value (e.g. 70 p.s.i.), the valve opens communication between the supply conduit and a passage 313d leading to the outer end of the auxiliary low pressure cylinder 182d. When the valve is closed under the influence of the closing spring 312d, cylinder 182d is connected to a conduit 320d leading to the sump. A compression spring 344 in the cylinder 182d urges the pistons 176d, 338 outwardly or to the left as shown in FIG. 5. The compartment in the cylinder 182d opposite the pressure side of the piston 176d has a drain 302d which communicates with the sump to prevent pressure from building up in this compartment on movement of the piston 176d.

During the initial delivery of fluid via the conduit 180d, the piston 280d moves to the right while the pressure remains relatively low and during such initial travel the valve 308d remains closed as shown in FIG. 5, and the pistons 176d, 338 remain in their extreme left-hand positions. When movement of the piston 280d is arrested due to engagement of the band with the drum, the pressure in the connected conduit portions 180d, 306d builds up until the valve 308d moves downwardly to close the vent passage 314d and open the supply connection to the auxiliary low pressure cylinder by connecting the passages 306d, 313d. Since the area of piston 176d is greater than that of the piston 338, the latter is capable of exerting much greater pressure in the high pressure cylinder 333 and movement of the auxiliary piston 176d to the right causes the high pressure piston 338 and its cup 340 to move in the same direction, thereby closing the inlet holes 335, trapping the liquid in the main cylinder 301d and exerting increased pressure upon such fluid and thereby upon the piston 280d and the brake band connected thereto, due to the multiplying action resulting from the differences in the diameters of the pistons.

Figure 6:
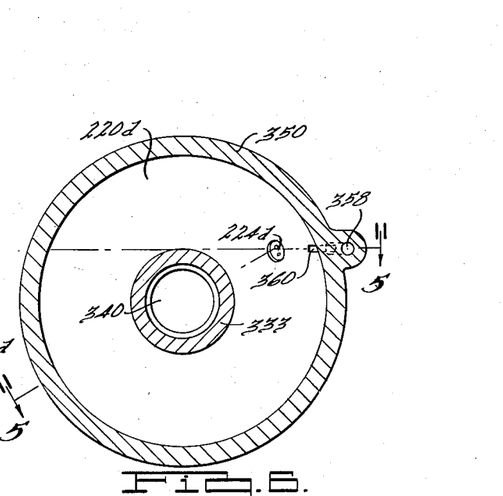
FIG. 6 is a cross-sectional view of the embodiment of FIG. 5, taken substantially on the line 6—6 of FIG. 5.
Figure 7:
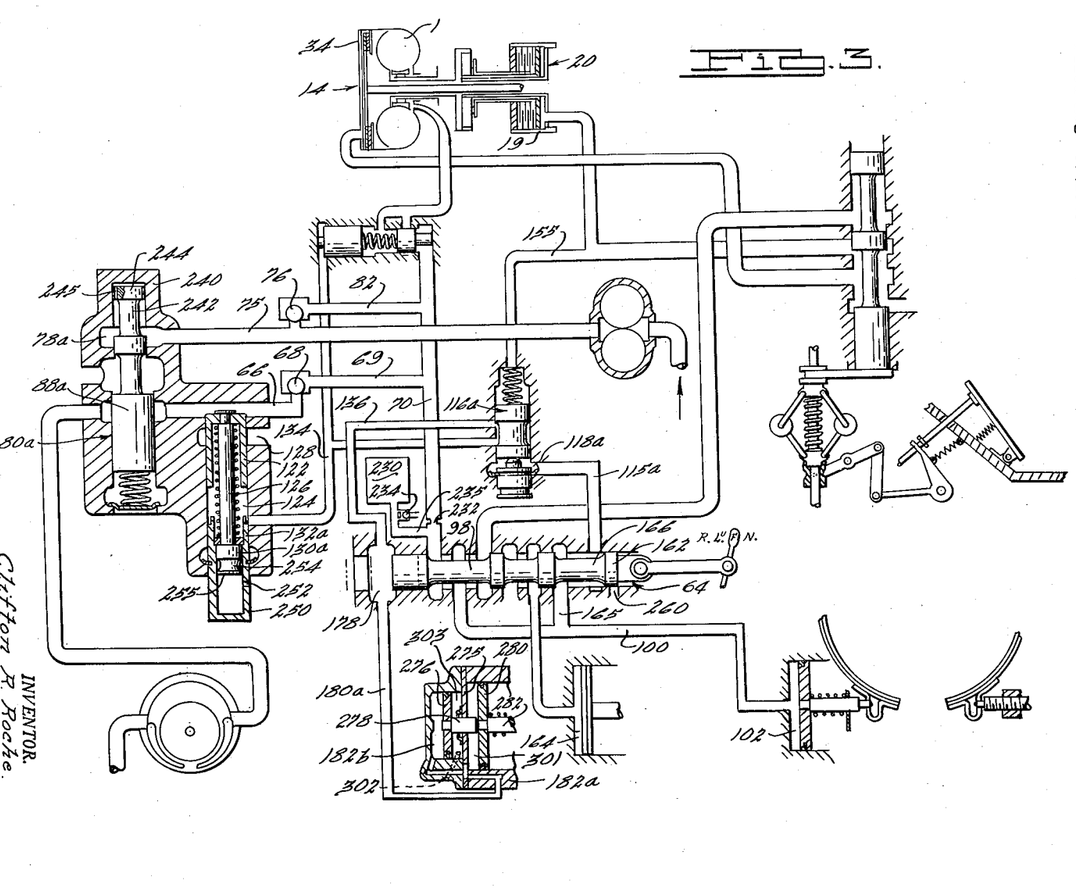

Referring to FIG. 6, it will be seen that both the ball check valve 224d and the inlet to the annular cushioning chamber 220d from the supply conduit 180d are located at an elevation above the top of the high pressure cylinder 333. Thus the oil level in the cushioning chamber can never be drained to a level below the top of the high pressure cylinder, all of the oil supply holes 335 in the wall of the high pressure cylinder being below the oil level at all times. Air is thereby prevented from entering the cylinders. Air, however, is trapped in the upper portion of the cushioning chamber 220d, thereby forming a compartment of compressible air to give a cushioning effect during the initial engagement of the band with the drum. As the initial engagement is caused by fluid from the passage 180d passing through the cushioning chamber 220d, and the holes 335 to act upon the piston 280d, and to build up the pressure on the piston 280d, the air trapped in the cushioning chamber must be compressed which acts to cushion the engagement of the band with the drum. The check valve 224d is located above the fluid level in the transmission case, and as in the other embodiments, provides a vent for the cushioning chamber so that when not under pressure, the ball will drop from its seat and allow excess oil that may have accumulated to drain the pressure dome to the proper level. Such a vent also prevents sucking oil from the conduit 180d to fill the cushioning chamber to an improper level, which would otherwise occur under the following conditions: During a hard run, the temperature of the transmission increases, which heats the air in the pressure dome. After such hard run, the air in the pressure dome cools which causes it to contract and if it were not for the vent of the check valve 224d, oil would be sucked into the cushioning chamber through the passage 180d and thereby decrease the effective volume of air trapped therein.

It will be noted that due to location of the supply conduit 180d and the check valve 224d, the cushioning chamber 220d provides both an oil reservoir to keep the oil level above the feed holes 335 and air trap compartment.

It will also be observed that all three cylinder portions are formed in one piece and adapted to be inserted in a cylindrical opening 350 defined by the wall of the transmission case. The partition 275d between the main low pressure cylinder and cushioning chamber 220d is slidably fitted into the cylindrical opening defined by the wall 350 and may be sealed with respect thereto by means of a toroidal gasket as 352. The partition 354 which separates the cushioning chamber 220d from the auxiliary low pressure cylinder 182d is extended radially outwardly to provide a peripheral flange 355 overlying the outside of the transmission case, to which it may be secured in sealed relation as by the screws 356 which support the entire servomotor assembly with respect to the transmission case. The partitions 275d and 354 constitute integral end flanges projecting from the wall of the high pressure cylinder 333, and the wall of the auxiliary low pressure assembly also forms an integral extension. Connection between the supply passage 180d and the interior of the cushioning chamber is through communicating passages 358, 360 formed in the wall of the transmission case and in the flange portion 355. In order to restrict the rate of fluid delivery to the cushioning chamber, the passage 360 may comprise a narrow slot, the action of which will accordingly conform to the action of the restriction 222 in the embodiment of FIG. 2.

It will be appreciated that with this means of augmenting the pressure applied to the brake bands it is not necessary to utilize the pressure increase regulating valve, and that this type of servomotor incorporating the pressure multiplying means may be provided for actuation of each band to which it is desired to apply increased holding effort. The pressure increasing valve may be omitted, or its effect need not be utilized in connection with speed ratios which are established by the application of braking means operable by this modified form of servomotor.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

I claim:
1. In combination with a source of hydraulic liquid under pressure, an hydraulically actuatable friction element, a displaceable motor element for actuating said friction element, chamber-defining portions appurtenant the motor element, fluid conducting portions through which liquid under pressure may be delivered from said source to said chamber-defining portions to displace such motor element, and means for controlling the rate of engagement of said friction element comprising a hydropneumatic accumulator having substantially unrestricted communication with the chamber, defined by said portions, and having gas entrapped above a level of liquid therein, a restriction-defining portion between said source and said accumulator and an inwardly opening check valve communicating with atmosphere and with said accumulator, the said fluid conducting portions including a movable valve means which when in one position connects the said chamber-defining portions and accumulator with the said source, and when in another position connects the said chamber-defining portions and accumulator with a drain port.

2. In combination with a source of hydraulic liquid under pressure, an hydraulically actuatable friction element, a displaceable motor element, for actuating said friction element, chamber-defining portions appurtenant the motor element, fluid conducting portions through which liquid under pressure may be delivered from said source to said chamber-defining portions to displace such motor element, and means for controlling the rate of engagement of said friction element comprising a hydropneumatic accumulator having substantially unrestricted communication with the chamber defined by said portions and having gas entrapped above a level of liquid therein, a restriction-defining portion between said source and said accumulator and an inwardly opening check valve communicating with atmosphere and with said accumulator, a second check valve incorporated in said fluid conducting portions between said source and said accumulator and opening in the direction of fluid flow into said chamber, and a portion defining a restricted by-pass around said last-mentioned check valve.

3. A fluid supply and control system for an automatic transmission adapted to be installed in an engine-driven vehicle, wherein said transmission is of the type having driving and driven elements and hydraulically operable ratio changing elements, said system including a first pump drivable by the driving element and a second pump drivable by the driven element, each of said pumps having an input portion and an output portion, means including a main fluid delivery line connected to the output portions of both of said pumps, a pair of check valves, one of said check valves being arranged between each of the pumps and said main fluid delivery line, means for reducing the power required to drive the first pump only, comprising a dump valve connected to the output portion of said first pump on the pump side of the check valve, and means responsive solely to the pressure developed by the second pump for actuating said dump valve, said means for actuating the dump valve comprising a pressure-regulating valve for the second pump connected to and actuatable by the output of the second pump and operatively connected to the dump valve to actuate the latter.

4. A fluid supply and control system for an automatic transmission adapted to be installed in an engine-driven vehicle, wherein said transmission is of the type having driving and driven elements and hydraulically operable ratio changing elements, said system including a first pump drivable by the driving element and a second pump drivable by said driven element, each pump having an output, means operatively connecting the outputs of said pumps to said ratio changing elements, and a disabling device for the first pump, comprising a dump valve connected to the output of the first pump, and means for actuating said dump valve solely in response to increased output pressure of the second pump, said means for actuating the dump valve comprising a pressure-regulating valve connected to and controlling the pressure of the output of said second pump and operatively connected to said dump valve to actuate the latter.

5. In a vehicle transmission, an input member adapted to be driven by the vehicle engine, an output shaft adapted to drive the vehicle wheels, a friction clutch operative on an increase in the pressure of the liquid in an operating chamber to establish driving connection between said input member and said output shaft, means for at times connecting said operating chamber with a supply passage, a first pump operated synchronously with said input member for at times supplying liquid to said supply passage, a second pump operated synchronously with said output shaft for at times supplying liquid to said supply passage, and means for causing the pressure of the liquid in said supply passage to be maintained at a first value when said first pump is supplying liquid and for causing the pressure of the liquid in said supply passage to be maintained at a substantially higher value when said first pump is inactive.

6. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivably by said driven element, a selector valve operatively connected to the pumps for controlling the connection between the outputs of said pumps and all of said ratio changing elements, said selector valve having at least one outlet, means for controllingly operatively directing fluid from said outlet of said selector valve to different ones of said ratio changing elements to so actuate the latter as to enable the provision of any of a plurality of driving speed ratios through the transmission, comprising a governor valve for establishing and interrupting flow of fluid from said outlet of the selector valve to at least one of said ratio changing elements to vary the speed ratio of the transmission, a pressure-regulating valve connected to the output of at least one of said pumps, and means connected to said governor valve for changing the controlling action of said pressure regulating means.

7. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a selector valve operatively connected to the pumps for controlling the connection between the outputs of said pumps and all of said ratio changing elements, said selector valve having at least one outlet, means for controllingly operatively directing fluid from said outlet of said selector valve to different ones of said ratio changing elements to so actuate the latter as to enable the provision of any of a plurality of driving speed ratios through the transmission, comprising a governor valve for establishing and interrupting flow of fluid from said outlet of the selector valve to at least one of said ratio changing elements, to vary the speed ratio of the transmission, a pressure-regulating valve connected to the output of the first pump, and means connected to said governor valve for controlling the action of said pressure-regulating means.

8. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said drivable element, a selector valve operatively connected to the pumps for controlling the connection between the outputs of said pumps and all of said ratio changing elements, said selector valve having at least one outlet, means for controllingly operatively directing fluid from said outlet of said selector valve to different ones of said ratio changing elements to so actuate the latter as to enable the provision of any of a plurality of driving speed ratios through the transmission, comprising a governor valve for establishing and interrupting flow of fluid from said outlet of the selector valve to at least one of said ratio changing elements, to vary the speed ratio of the transmission, a pressure-regulating valve connected to the output of at least one of said pumps, and means connected to said governor valve and to said selector valve for controlling the action of said pressure-regulating means.

9. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said drivable element, a selector valve operatively connected to the pumps for controlling the connection between the outputs of said pumps and all of said ratio changing elements, said selector valve having at least one outlet, means for controllingly operatively directing fluid from said outlet of said selector valve to different ones of said ratio changing elements to so actuate the latter as to enable the provision of any of a plurality of driving speed ratios through the transmission, comprising a governor valve for establishing and interrupting flow of fluid from said outlet of the selector valve to at least one of said ratio changing elements, to vary the speed ratio of the transmission, a pressure-regulating valve connected to the output of the first pump, and means connected to said governor valve and to said selector valve for controlling the action of said pressure-regulating means.

10. A system as defined in claim 6 wherein the selector valve is movable to forward and reverse drive positions, and means connecting said selector valve to the pressure-regulating means to actuate the pressure-regulating means in response to movement of said selector valve to reverse drive position.

11. A system as defined in claim 9 wherein the selector valve is movable to forward, neutral and reverse drive positions, and means connecting said selector valve to the pressure-regulating means to actuate the pressure-regulating means to increase the effective pressure of the first pump in response to movement of said selector valve to either forward or reverse drive position.

12. A fluid supply and control system for an automatic transmission adapted to be installed in an engine-driven vehicle, said transmission having driving and driven elements and hydraulically operable ratio changing elements, said system including a first pump drivable by the driving element and a second pump drivable by said driven element, each of said pumps having an output portion, a selector valve operatively connected to the pumps for controlling the connection between the output portions of said pumps and all of said ratio changing elements, said selector valve having at least one outlet, means for controlling operatively directing fluid from said outlet of said selector valve to different ones of said ratio changing elements to so actuate the latter as to enable the provision of any of a plurality of driving speed ratios through the transmission, comprising a governor valve for establishing and interrupting flow of fluid from said outlet of the selector valve to at least one of said ratio changing elements, to vary the speed ratio of the transmission, pressure regulating means including a pressure-regulating valve connected to the output of the first pump, means connected to said governor valve and to said selector valve for controlling the action of said pressure-regulating means, said selector valve being movable to forward, neutral and reverse drive positions, means connecting said selector valve to the pressure-regulating means to actuate the pressure-regulating means to increase the effective pressure of the first pump in response to movement of said selector valve to either forward or reverse drive position, said governor valve being movable to low speed and high speed positions, and means responsive to movement of the governor valve for actuating the pressure-regulating means.

13. A fluid supply and control system for an automatic transmission adapted to be installed in an engine-driven vehicle, said transmission having driving and driven elements and hydraulically operable ratio changing elements, said system including a first pump drivable by the driving element and a second pump drivable by said driven element, each of said pumps having an output portion, a selector valve operatively connected to the pumps for controlling the connection between the output portions of said pumps and all of said ratio changing elements, said selector valve having at least one outlet, means for controllingly operatively directing fluid from said outlet of said selector valve to different ones of said ratio changing element to so actuate the latter as to enable the provision of any of a plurality of driving speed ratios through the transmission, comprising a governor valve for establishing and interrupting flow of fluid from said outlet of the selector valve to at least one of said ratio changing elements to vary the speed ratio of the transmission, pressure regulating means including a pressure-regulating valve connected to the output of the first pump, means connected to said governor valve and to said selector valve for controlling the action of said pressure-regulating means, said selector valve being movable to forward, neutral and reverse drive positions, means connecting said selector valve to the pressure-regulating valve to actuate the pressure-regulating valve to increase the effective pressure of the first pump in response to movement of said selector valve to either forward or reverse drive position, said governor valve being movable to low speed and high speed position, and means responsive to movement of the governor valve to high speed position for actuating the pressure-regulating valve to decrease the effective pressure of the first pump.

14. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, and means responsive to increased output pressure of the second pump for disabling the first pump including a dump valve incorporated in the output of the first pump and operable by pressure derived from the second pump.

15. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, and means responsive to movement of the speed controlling valve for actuating said pressure increasing device to change the effective output pressure of the first pump.

16. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, and means responsive to movement of the speed controlling valve to high speed position for decreasing the effective output pressure of the first pump.

17. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a dump valve connected to the output of the second pump, and means responsive to movement of the said selector valve to forward drive position for opening said dump valve.

18. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a dump valve connected to the output of the second pump, and means responsive to movement of the said selector valve to reverse drive position for opening said dump valve.

19. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a dump valve connected to the output of the second pump, and means responsive to movement of the said selector valve to either forward drive position or reverse drive position for opening said dump valve.

20. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a biased pressure limiting valve connected to the output of the first pump, means for increasing the bias of said biased pressure limiting valve to raise the effective output pressure of said first pump including a pressure increase regulating valve connected to and actuatable by the selector valve to augment the bias applied to said biased pressure limiting valve in response to movement of the selector valve to forward drive position.

21. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively direction fluid from said outlet of said selector valve to different ones of said ratio changing elements and movable to high speed and low speed positions, pressure increasing means responsive to movement of the selector valve to either forward or reverse position for increasing the effective output pressure of the first pump, a biased pressure limiting valve connected to the output of the first pump, means for increasing the bias of said biased pressure limiting valve to raise the effective output pressure of said first pump including a pressure increase regulating valve connected to and actuatable by the selector valve to augment the bias applied to said biased pressure limiting valve, and means effective to increase the bias of said biased pressure limiting valve in response to movement of the selector valve to reverse drive position.

22. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a biased pressure limiting valve connected to the output of the first pump, means for increasing the bias of said biased pressure limiting valve to raise the effective output pressure of said first pump including a pressure increase regulating valve connected to and actuatable by the selector valve to augment the bias applied to said biased pressure limiting valve in response to movement of the selector valve to forward drive position, and means effective to increase the bias of said biased pressure limiting valve in response to movement of the selector valve to reverse drive position.

23. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a biased pressure limiting valve connected to the output of the first pump, means for increasing the bias of said biased pressure limiting valve to raise the effective output pressure of said first pump in response to movements of the selector valve to either forward drive position or reverse drive position, including a pressure increase regulating valve connected to and actuatable by the selector valve to augment the bias applied to said pressure limiting valve, said pressure increase regulating valve also being connected to an output portion of said speed controlling valve and actuatable in response to movement of the last mentioned valve to high speed position.

24. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a biased pressure limiting valve connected to the output of the first pump, means for increasing the bias of said biased pressure limiting valve to raise the effective output pressure of said first pump in response to movement of the selector valve to either forward drive position or reverse drive position, including a pressure increase regulating valve connected to and actuatable by the selector valve to augment the bias applied to said pressure limiting valve, and a disabling valve operatively connected to and movable with said pressure increase regulating valve to disable the second pump.

25. A fluid supply and control system for an automatic transmission adapted to be installed in an engine-driven vehicle, said transmission having driving and drivable elements and hydraulically actuatable ratio changing elements, said system including a first pump drivable by the driving element and a second pump drivable by said driven element, a main fluid supply portion connected to the outputs of both of said pumps, a pair of check valves, one such check valve being connected between the output of each pump and such main fluid supply portion to prevent backflow to either pump, a selector valve movable to forward, neutral and reverse positions and connected between said main fluid supply portion and all of said ratio changing elements, said selector valve having at least one outlet, a speed controlling valve for controllingly and operatively directing fluid from said outlet of said selector valve to different ones of said ratio changing elements and movable to high speed and low speed positions, pressure increasing means responsive to movement of the selector valve to either forward or reverse position for increasing the effective output pressure of the first pump, a biased pressure limiting valve connected to the output of the first pump, means for increasing the bias of said biased pressure limiting valve to raise the effective output pressure of said first pump in response to movement of the selector valve to either forward drive position or reverse drive position including a pressure increase regulating valve connected to and actuatable by the selector valve to augment the bias applied to said pressure limiting valve, and a disabling valve operatively connected to and movable with said pressure increase regulator valve to disable the second pump concurrently with movement of the pressure increase regulating valve to a position to increase the effective output pressure of the first pump.

26. In combination with a source of hydraulic fluid, a friction-type torque transmitting device and a hydraulically actuatable servo motor for actuating said device, valve means for selectively directing hydraulic fluid from said source to said servo motor, a hydropneumatic accumulator connected to said system at a point between said valve means and said source, and a restriction portion interposed in said system between said source and the point of connection of said accumulator, said accumulator having an upper air space portion, and a drain valve communicating with atmosphere and with said accumulator and located in a position below said air space portion, to allow excess accumulator fluid to drain from the accumulator through the valve, and also to allow such excess fluid to be replaced with air.

27. A control system for a fluid operated variable speed power transmitting device having a pump driven from the power input member of the device; said system comprising a pressure regulating valve including a plunger controlling the output of the power input pump and adapted in one position to vent the said power input pump, fluid means urging the plunger to its venting position, resilient means opposing the said fluid means such that the fluid pressure produced by the power input pump is limited to a predetermined value, and a pressure regulating and controlling valve connected to the output of the power input pump, said pressure regulating and controlling valve being connected to supply fluid under pressure to the first pressure regulating valve in opposition to the fluid means urging the plunger to its venting position, whereby to enable the said power input pump to supply fluid under high pressure to the system.

28. The combination defined in claim 26 wherein the drain valve is a horizontally mounted ball check valve which closes outwardly toward the atmosphere and which opens inwardly toward said accumulator.

References Cited in the file of this patent

UNITED STATES PATENTS

| | | |
|---|---|---|
| 612,324 | Frazier et al. | Oct. 11, 1898 |
| 840,876 | Steadman | Jan. 8, 1907 |
| 840,877 | Steadman | Jan. 8, 1907 |
| 958,853 | Bulley | May 24, 1910 |
| 1,326,228 | Turner | Dec. 30, 1919 |
| 1,394,245 | Berry | Oct. 18, 1921 |
| 1,943,527 | Hayes | Jan. 16, 1934 |
| 1,982,711 | Vickers | Dec. 4, 1934 |
| 2,020,640 | Guenther | Nov. 12, 1935 |
| 2,103,540 | Livermore | Dec. 28, 1937 |
| 2,105,625 | Wichtendahl | Jan. 18, 1938 |
| 2,150,026 | Criley | Mar. 7, 1939 |
| 2,151,057 | Suth | Mar. 21, 1939 |
| 2,193,305 | Thompson | Mar. 12, 1940 |
| 2,204,872 | Thompson | June 18, 1940 |
| 2,221,393 | Carnegie | Nov. 12, 1940 |
| 2,223,716 | Bojesen | Dec. 3, 1940 |
| 2,282,949 | Dolza | May 12, 1942 |
| 2,329,724 | Maurer | Sept. 21, 1943 |
| 2,332,593 | Nutt et al. | Oct. 26, 1943 |
| 2,343,955 | Cotterman | Mar. 14, 1944 |
| 2,347,379 | Teeter | Apr. 25, 1944 |
| 2,372,393 | Ray | Mar. 27, 1945 |
| 2,474,512 | Bechtold et al. | June 28, 1949 |
| 2,516,203 | Greenlee | July 25, 1950 |
| 2,516,208 | Hasbany | July 25, 1950 |
| 2,548,208 | Evernden | Apr. 10, 1951 |
| 2,647,371 | Ericson | Aug. 4, 1953 |
| 2,707,887 | Slack | May 10, 1955 |

FOREIGN PATENTS

| | | |
|---|---|---|
| 419,565 | Great Britain | Nov. 14, 1934 |
| 445,703 | Great Britain | Apr. 15, 1936 |
| 474,539 | Great Britain | Nov. 3, 1937 |
| 531,465 | Great Britain | Jan. 6, 1941 |
| 478,522 | Canada | Nov. 13, 1951 |

UNITED STATES PATENT OFFICE
CERTIFICATE OF CORRECTION

Patent No. 3,025,725                                            March 20, 1962

Clifton R. Roche

It is hereby certified that error appears in the above numbered patent requiring correction and that the said Letters Patent should read as corrected below.

Column 7, line 49, strike out "by", first occurrence; column 14, line 19, after "affords" insert a comma; line 22, for "wil" read -- will --; column 18, line 28, for "drivably" read -- drivable --; column 20, line 19, for "element" read -- elements --; column 23, line 10, for "direction" read -- directing --.

Signed and sealed this 4th day of September 1962.

(SEAL)
Attest:

ERNEST W. SWIDER                                       DAVID L. LADD
Attesting Officer                                           Commissioner of Patents